United States Patent
Seo (10) Patent No.: US 7,876,383 B2
(45) Date of Patent: Jan. 25, 2011

(54) DIGITAL BROADCASTING RECEIVER TO SEARCH CHANNELS IN PARALLEL AND CHANNEL SEARCHING METHOD THEREOF

(75) Inventor: Young-joo Seo, Suwon-si (KR)

(73) Assignee: Samsung Electronics Co., Ltd, Suwon-si (KR)

(*) Notice: Subject to any disclaimer, the term of this patent is extended or adjusted under 35 U.S.C. 154(b) by 1712 days.

(21) Appl. No.: 10/981,533

(22) Filed: Nov. 5, 2004

(65) Prior Publication Data

US 2005/0134747 A1     Jun. 23, 2005

(30) Foreign Application Priority Data

Dec. 22, 2003   (KR) .................... 10-2003-0094379

(51) Int. Cl.
- H04N 5/46 (2006.01)
- H04N 5/50 (2006.01)
- H04N 5/445 (2006.01)
- G06F 3/00 (2006.01)

(52) U.S. Cl. ............... 348/732; 348/555; 348/556; 725/38

(58) Field of Classification Search ......... 348/731–732, 348/555–556; 725/38
See application file for complete search history.

(56) References Cited

U.S. PATENT DOCUMENTS

| | | | |
|---|---|---|---|
| 5,461,427 A * | 10/1995 | Duffield et al. | 348/555 |
| 6,137,546 A * | 10/2000 | Shintani et al. | 348/731 |
| 6,317,168 B1 * | 11/2001 | Seo | 348/725 |
| 6,353,463 B1 * | 3/2002 | Seo | 348/731 |
| 6,377,316 B1 * | 4/2002 | Mycynek et al. | 348/731 |

(Continued)

FOREIGN PATENT DOCUMENTS

JP    01-311681    12/1989

(Continued)

OTHER PUBLICATIONS

Korean Official Action issued on Aug. 30, 2005, for Korean Patent Application No. 2003-94379 (listing 2 references).

Primary Examiner—Brian Yenke
(74) Attorney, Agent, or Firm—Stanzione & Kim LLP (57) ABSTRACT

A digital broadcasting receiver includes a RF switch to divide an entire channel range of an input broadcasting signal into at least two channel ranges for at least one of a received air broadcasting signal and a cable broadcasting signal, at least two channel searching parts to search each channel range distributed from the RF switch and to check channels in sequence from a lowest channel to a highest channel within the channel range to determine whether one of the digital broadcasting signal and the analog broadcasting signal is received, a memory to record information on a valid channel through which one of the digital broadcasting signal and the analog broadcasting signal is received in the entire channel range of the broadcasting signal, and a CPU to control the at least two channel searching parts in parallel to search each distributed channel range for the valid channel, and to determine the valid channel if the channel searching parts determine that a certain broadcasting signal is received, and to record the result into the memory, thereby, reducing the time taken to search a digital broadcasting channel and an analog broadcasting channel received through air and cable broadcasting signal.

17 Claims, 4 Drawing Sheets

U.S. PATENT DOCUMENTS

| | | | |
|---|---|---|---|
| 6,483,553 B1 * | 11/2002 | Jung | 348/731 |
| 6,486,925 B1 * | 11/2002 | Ko | 348/731 |
| 6,519,011 B1 * | 2/2003 | Shendar | 348/731 |
| 6,538,704 B1 * | 3/2003 | Grabb et al. | 348/731 |
| 6,542,203 B1 * | 4/2003 | Shadwell et al. | 348/726 |
| 6,600,522 B1 * | 7/2003 | Kim | 348/731 |
| 6,714,264 B1 * | 3/2004 | Kempisty | 348/732 |
| 6,721,018 B1 * | 4/2004 | Shintani et al. | 348/731 |
| 6,731,349 B1 * | 5/2004 | Van Der Wijst | 348/732 |
| 6,757,029 B2 * | 6/2004 | Kurihara | 348/731 |
| 6,817,027 B1 * | 11/2004 | Curreri | 725/28 |
| 6,847,407 B2 * | 1/2005 | Min | 348/565 |
| 6,990,679 B2 * | 1/2006 | Curreri | 725/56 |
| 7,016,435 B2 * | 3/2006 | Adachi | 375/345 |
| 7,017,177 B1 * | 3/2006 | Funakoshi | 725/118 |
| 7,027,108 B2 * | 4/2006 | Kim | 348/732 |
| 7,030,933 B2 * | 4/2006 | Takagi et al. | 348/569 |
| 7,061,542 B1 * | 6/2006 | Ikeguchi | 348/558 |
| 7,158,190 B2 * | 1/2007 | Ikeguchi | 348/731 |
| 7,215,382 B2 * | 5/2007 | Bennett | 348/570 |
| 7,221,412 B2 * | 5/2007 | Shibusawa | 348/732 |
| 2002/0067437 A1 * | 6/2002 | Tsubouchi et al. | 348/725 |
| 2003/0163830 A1 * | 8/2003 | Nam | 725/120 |
| 2004/0036811 A1 * | 2/2004 | Ikeguchi | 348/732 |
| 2004/0051816 A1 * | 3/2004 | Ikeguchi | 348/732 |

FOREIGN PATENT DOCUMENTS

| | | |
|---|---|---|
| JP | 2002-171453 | 6/2002 |
| JP | 2002-218334 | 8/2002 |
| KR | 1997-4754 | 6/1995 |
| KR | 1998-040572 | 8/1998 |
| KR | 2001-9609 A | 2/2001 |
| KR | 2001-18670 A | 3/2001 |

* cited by examiner

DIGITAL BROADCASTING RECEIVER TO SEARCH CHANNELS IN PARALLEL AND CHANNEL SEARCHING METHOD THEREOF

CROSS-REFERENCE TO RELATED APPLICATIONS

This application claims the benefit of Korean Patent Application No. 2003-94379 filed on Dec. 22, 2003, in the Korean Intellectual Property Office, the disclosure of which is incorporated herein by reference.

BACKGROUND OF THE INVENTION

1. Field of the Invention

The present general inventive concept relates to a digital broadcasting receiver and a channel searching method thereof. More particularly, the present general inventive concept relates to a digital broadcasting receiver and a channel searching method of speedily searching channels by searching and storing a digital signal and an analog signal in parallel.

2. Description of the Related Art

As digital technique has been developed, a broadcasting system initially transmitted using an analog signal, such as a NTSC, PAL or SECAM system, can be transmitted by a digital system, such as ATSC, DVB-T, ISDB-T or QAM, and it has been commercially available to transmit a digital broadcasting signal using a satellite. However, digital broadcasting equipment and digital broadcasting receivers are relatively expensive, and digital broadcasting technique is yet to be completed. As such, an analog system and a digital system are both used for a certain transition period until the digital broadcasting technique is completely systemized and the digital broadcasting receiver becomes widely distributed to users.

In order to realize both the analog system and the digital system, a broadcasting receiver is required to receive both an analog broadcasting signal and a digital broadcasting signal, and in order to meet this requirement, a combination digital broadcasting receiver has been developed, which has a tuner capable of receiving both the analog broadcasting signal and the digital broadcasting signal.

One of characteristics of a digital broadcast and digital broadcasting receiver is multi-channelization. If an analog broadcasting system is applied, only one program can be transmitted through a single bandwidth. However, if a digital broadcasting system is applied, four programs can be transmitted through a single bandwidth because the digital broadcasting system applies MPEG2 technique which can compress and restore an image and a sound in a high density to simultaneously transmit the four programs. Due to multi-channelization of digital broadcasting, a user can select various broadcasting signals of a clear image quality.

A user selects a desirable channel using a remote controller or channel selection means attached to a main body. Since there are a variety of digital broadcasting channels, a digital broadcasting receiver generally has a function of automatic channel search (ACS) for automatically setting a channel without requiring a user's selection. The ACS function is an automatic channel search function, which skips channels that are not capable of receiving a broadcasting signal or channels that have a weak signal, to automatically set the channel capable of receiving the broadcasting signal.

Figure 1:
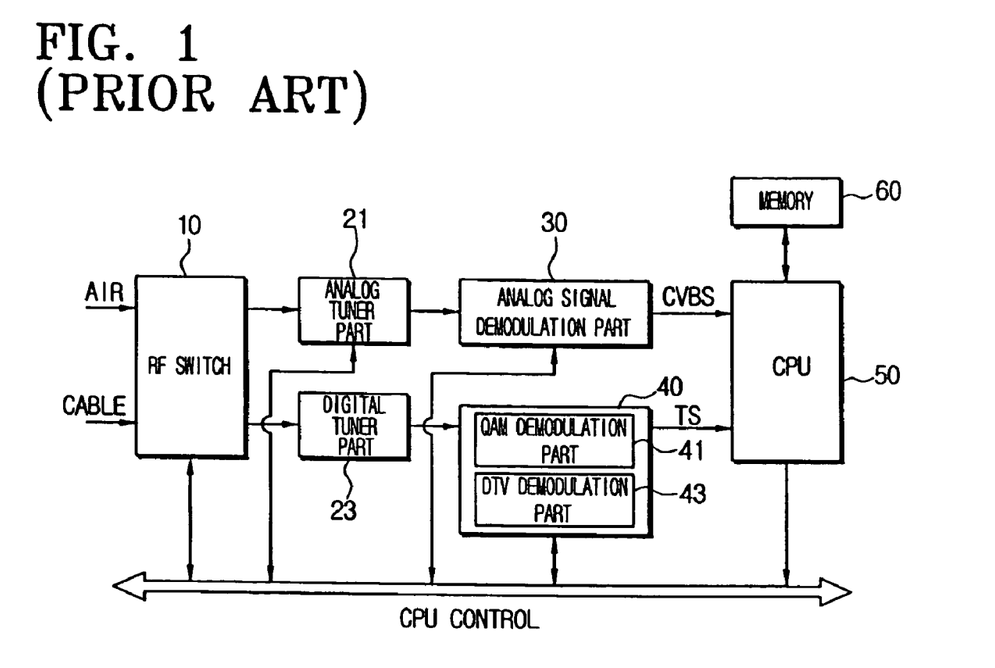
FIG. 1 is a block diagram explaining a conventional digital broadcasting receiver.

FIG. 1 is a block diagram explaining a general combination digital broadcasting receiver having an ACS function. Referring to FIG. 1, the combination digital broadcasting receiver receives both analog and digital broadcasting signals and comprises a RF switch 10, an analog tuner part 21, a digital tuner part 23, an analog signal demodulation part 30, a digital signal demodulation part 40, a CPU 50 and a memory 60.

If the CPU 50 enters an automatic channel searching mode by an external signal, the RF switch 10 distributes the received air or cable analog broadcasting signal and transmits a first analog signal to the analog tuner part 21. The analog tuner part 21 receives a broadcasting signal while tuning from a lowest channel to a highest channel of an analog signal bandwidth, and the tuned analog signal is demodulated by the analog signal demodulation part 30 and transmitted to the CPU 50 in a CVBS signal. The CPU 50 determines a valid channel based on a magnitude of the tuned signal to store in the memory 60.

If the above analog signal channel search is finished, the RF switch 10 transmits the digital broadcasting signal to the digital tuner part 23. The digital tuner part 23 receives the broadcasting signal while tuning from the lowest channel to the highest channel, and the tuned digital signal is transmitted to the digital broadcasting demodulation part 40.

The digital signal demodulation part 40 comprises a plurality of demodulation parts 41 and 43 depending on a digital broadcasting system. In specific, the digital signal demodulation part 40 comprises a quadrature amplitude modulation (QAM) block 41 and a DTV demodulation part 43 to receive the tuned digital signal transmitted in an ATSC (Advanced Television Systems Committee) standard system which is referred to as a USA system, a DVB (Digital Video Broadcasting Terrestrial) standard system which is referred to as a European system, and an ISDM-T (Integrated Services Digital Broadcasting-Terrestrial) standard system which is referred to as a Japanese system.

With respect to a digital signal stream demodulated by the digital signal demodulation part 40, the CPU 50 determines a valid channel to store in the memory 60, thereby finishing the automatic channel search (ACS) for the analog signal and the digital signal.

Digital transmission systems are a very diverse and separate demuxing process, and require video/audio decoding after tuning, and therefore, much time is wasted for converting channels. In addition, the number of digital cable channels is far greater than analog cable channels, for example, there are appropriately five hundred (500) digital cable channels including virtual channels.

If an analog signal channel is first searched and then digital signal channel is searched as a conventional way, it spends much time to search a digital signal channel such that it is inconvenient to user. Even if analog and digital signals are each searched at the same time, it takes much more time to search the digital signal channel. Accordingly, a channel search time is not remarkably reduced.

SUMMARY OF THE INVENTION

In order to solve the above and/or other problems, it is an aspect of the present general inventive concept to provide a digital broadcasting receiver and a channel searching method using the digital broadcasting receiver capable of saving time to search channels using a parallel search of analog and digital signal channels.

Additional aspects and advantages of the present general inventive concept will be set forth in part in the description which follows and, in part, will be obvious from the description, or may be learned by practice of the general inventive concept.

The above and/or other aspects and advantages of the present general inventive concept may be achieved by providing a digital broadcasting receiver comprising a RF switch to divide an entire channel range of a broadcasting signal into at least two channel ranges for at least one broadcasting signal of a received air broadcasting signal and a cable broadcasting signal, at least two channel searching parts to search each channel range distributed from the RF switch for a valid channel by checking in sequence from a lowest channel to a highest channel within the channel range to determine whether one of the digital broadcasting signal and the analog broadcasting signal is received, a memory to record information on the valid channel through which one of the digital broadcasting signal and the analog broadcasting signal is received in the entire channel range of the broadcasting signal, and a CPU to control the at least two channel searching parts in parallel to search the valid channel from each distributed channel range, and to determine whether the channel corresponding to the received broadcasting signal is the valid channel to be recorded in the memory if the channel searching parts determine that certain broadcasting signal is received.

In an aspect of the present general inventive concept, the channel searching part may comprise a tuner part to tune the received broadcasting signal for the distributed channel range, and a demodulation block to demodulate the tuned broadcasting signal according to a broadcasting system. The demodulation block may comprise an analog signal demodulation block to demodulate a tuned analog broadcasting signal, a DTV demodulation block to demodulate a tuned digital broadcasting signal, and a QAM demodulation block to demodulate a QAM-modulated digital signal.

The above and/or other aspects and advantages of the present general inventive concept, may also be achieved by providing a digital broadcasting receiver comprising a RF switch to divide the received broadcasting signal into an air broadcasting signal and a cable broadcasting signal, a first channel searching part to search the entire channel range of the air broadcasting signal distributed from the RF switch and to sequentially check each channel from a lowest channel to a highest channel within the channel range to determine whether one of a digital broadcasting signal and an analog broadcasting signal is received, a second channel searching part to search the entire channel range of the cable broadcasting signal distributed from the RF switch for a valid channel by sequentially checking from the lowest channel to the highest channel within the channel range to determine whether one of the digital broadcasting signal and the analog broadcasting signal is received, a memory to record information on the valid channel through which one of the digital broadcasting signal and the analog broadcasting signal is received, and a CPU to control the first and second channel searching parts in parallel to search the entire channel range of the broadcasting signal distributed in each channel searching part, to determine whether the channel through which the broadcasting signal is received is the valid channel if each channel searching part determines that a certain broadcasting signal is received, and to record the valid channel in the memory.

In an aspect of the present general inventive concept, the first and second channel searching parts each comprise a tuner part to tune the received digital and analog signals for the entire channel range of the air and cable broadcasting signals, and a demodulation block to demodulate the digital signal and the analog signal tuned from the tuner part according to a corresponding broadcasting system.

The above and/or other aspects and advantages of the present general inventive concept, may also be achieved by providing a channel searching method of a digital broadcasting receiver, the channel searching method comprising dividing an entire channel range of an input broadcasting signal into two channel ranges to correspond to at least one of an air broadcasting signal and a cable broadcasting signal to distribute the divided channel ranges to at least two channel searching parts by certain channel range, respectively sequentially checking from a lowest channel to a highest channel within the channel range to determine whether one of a digital broadcasting signal and an analog broadcasting signal for the channel range each distributed from the at least two channel searching parts is received, and selecting a valid channel through which one of the digital broadcasting signal and the analog broadcasting signal is received, and recording the valid channel.

In an aspect of the present general inventive concept, the sequentially checking of from the lowest channel to the highest channel may comprise sequentially tuning the digital signal and analog signal received within each distributed channel range, and demodulating the tuned digital broadcasting signal and analog broadcasting signal.

In another aspect of the present general inventive concept, the dividing of the entire channel range may comprise dividing the air broadcasting signal and the cable broadcasting signal if the channel is searched from the air and cable broadcasting signals, and distributing the divided signal to the at least two channel searching parts.

In another aspect of the present general inventive concept, a digital broadcasting channel is searched by the first and second channel searching parts, so that a search time taken to automatically search the entire channel can be reduced.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures. Also, well-known functions or constructions are not described in detail since they would obscure the invention in unnecessary detail.

Figure 2:
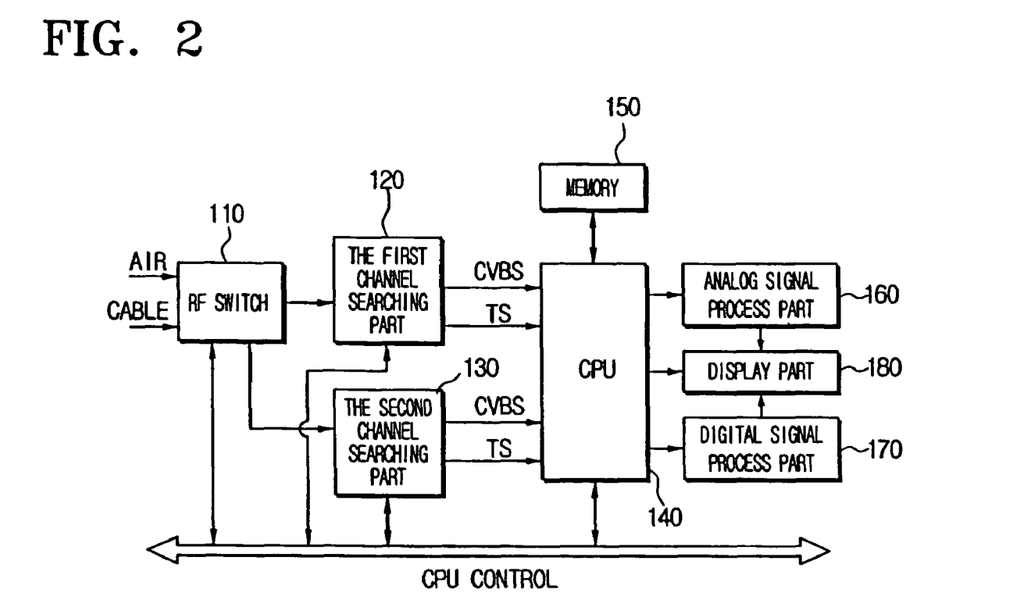
FIG. 2 is a block diagram explaining a digital broadcasting receiver according to an embodiment of the present general inventive concept.

FIG. 2 is a block diagram explaining a digital broadcasting receiver according to an embodiment of the present general inventive concept. Referring to FIG. 2, the digital broadcasting receiver may comprise a RF switch 110, a first channel searching part 120, a second channel searching part 130, a central processing unit (CPU) 140, a memory 150, an analog signal process part 160, a digital signal process part 170 and a display part 180.

The RF switch 110 can independently switch air or cable broadcasting signal received through an antenna or a cable.

The first channel searching part 120 and the second channel searching part 130 can search a channel range of the cable broadcasting signal and/or the air broadcasting signal switched and received by the RF switch 110 such that the first and second channel searching parts 120 and 130 can determine whether an analog signal and a digital signal are received within the channel range. For this, the first channel searching part 120 and the second channel searching part 130 may be Network Interface Module (NIM) having a tuner part to tune the digital sigma and the analog signal, and a demodulation block according to broadcasting systems, such as Analog NTSC (PAL), QAM, ATSC (DVB-T, ISDB-T), and so on. The NIM may comprise a tuner to receive an external broadcasting signal, and a demodulator to separate an analog data signal and a digital data signal. The NIM may be one of essential parts of a set-top box for a digital satellite, a digital terrestrial wave, and a cable broadcast or a digital TV having a set-top box function.

If the cable broadcasting signal or the air broadcasting signal is received, the RF switch 110 can divide an entire channel range of the broadcasting signal into two channel ranges to assign to the first channel searching part 120 and the second channel searching part 130. If only the cable broadcasting signal is received or a channel searching command is input only for the cable broadcasting signal, the RF switch 110 classifies the entire channel range of the cable broadcasting signal into the two channel ranges, i.e., a first channel range and a second channel range. Accordingly, the first and second channel searching parts 120 and 130 can search a channel in parallel. That is, the first channel searching part 120 can search the first channel range to determine whether there is a channel to receive one of a certain digital signal and an analog signal within the first channel range, and the second channel searching part 130 can search the second channel range to determine whether there is a channel to receive one of the certain digital signal and the analog signal within the second channel range.

If only the air broadcasting signal is received, or the channel is searched only for the air broadcasting signal, the RF switch 110 can divide and assign the entire channel range of the air broadcasting signal into the two channel ranges to search channels from the two channel ranges of the first and second channel searching parts 120 and 130 in parallel.

If both the air and cable broadcasting signals are received, a user can input the channel searching command to search for all the air and cable broadcasting signals, and the first channel searching part 120 and the second channel searching part 130 can search channels by dividing a cable broadcasting channel and an air broadcasting channel each into certain channel section, according to an aspect of the present general inventive concept. In specific, the entire channel range of cable broadcasting signal can be divided into the first and the second channel ranges, and the entire channel range of the air broadcasting signal can be divided into another first and another second channel ranges such that the first channel searching part 120 searches the broadcasting signal within the first and the another first channel ranges while the second channel searching part 120 searches the broadcasting signal within the second and the another second channel ranges. The whole channel searching time can be reduced by using the two channel searching parts 120 and 130 in parallel.

According to another aspect of the present general inventive concept, if both the cable and air broadcasting signals are simultaneously received, and a user inputs the channel searching command to search for all the cable and air broadcasting signals, the first channel searching part 120 may search the air broadcasting signal, and the second channel searching part 130 may search the cable broadcasting signal.

If one of the digital broadcasting signal and the analog broadcasting signal is received in a certain channel of the divided channel ranges, each channel searching part 120 or 130 can tune the digital or analog signal to be demodulated, and an transmit the demodulated digital or analog signal to the CPU 140. The CPU 140 can check a magnitude of the received signal to determine whether the received digital and analog broadcasting signals are determined to be the valid channel, and if so, the CPU 140 can record the valid channel to the memory 150. If all the valid channels are found from the entire channel range, the process of automatically selecting the channel is finished.

A user can change a channel using a channel direction button without inputting channel numbers. In specific, if a user selects a certain direction key on a main body and a remote controller, a nearest channel information in a selected direction from the present channel is read from the memory 150 to receive a signal of the corresponding channel. If the selected channel is the digital broadcasting channel, the CPU 140 can tune the digital broadcasting signal received in the corresponding channel to be demodulated, and can transmit the demodulated signal in a digital stream to the digital signal processing part 170. The digital signal processing part 170 can process the demodulated digital signal to indicate the received broadcasting signal on the display part 180. This digital signal process may include RGB color signal conversion of an input image signal (processed digital signal), demodulization of a compressed image signal, removal of noise of the broadcasting signal. If the analog channel is selected, the analog signal process part 160 can process the analog signal as described above to indicate the signal via the display part 180.

Figure 3:
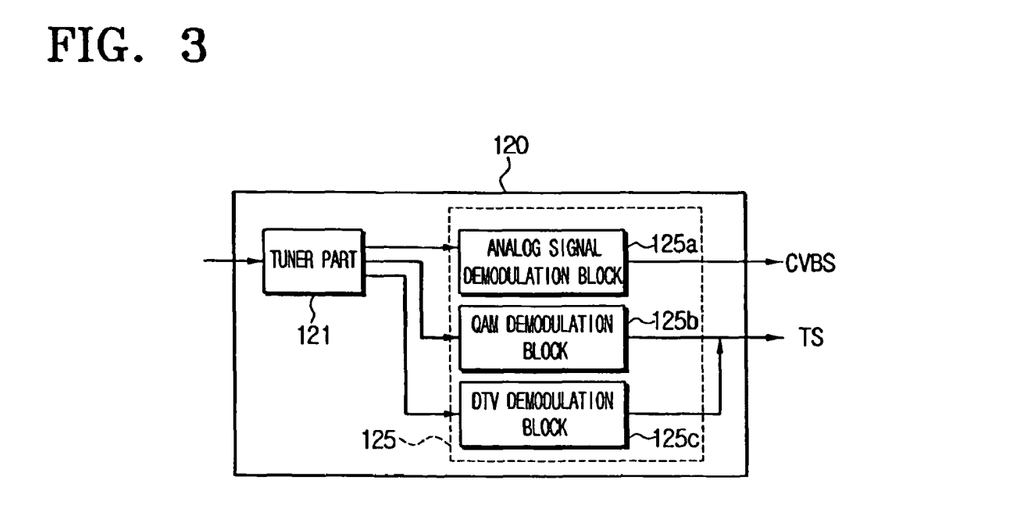
FIG. 3 is a block diagram explaining a first channel searching part of the digital broadcasting receiver of FIG. 2.

FIG. 3 is a block diagram of the first channel searching part 120 of the digital broadcasting receiver of FIG. 2. Referring to FIGS. 2 and 3, the first channel searching part 120 may comprise a tuner part 121 and a demodulation block 125. The tuner part 121 may include a tuner capable of tuning both the digital signal and the analog signal.

The demodulation block 125 can demodulate the tuned signal according to a broadcasting system and can comprise an analog signal demodulation block 125A, a QAM demodulation block 125B and a DTV digital television signal demodulation block 125C. The analog broadcasting signal transmitted in NTSC, PAL or SECAM system can be demodulated in the analog signal demodulation block 123 to transmit the demodulated signal to the CPU 140 in a form of a composite video and binding signal (CVBS). The digital signal transmitted in QAM (quadrature amplitude modulation system) can be demodulated in the QAM demodulation block 125, and the other digital signals transmitted in ATSC, DVB-T and ISDB-T systems can be demodulated in the DTV demodulation block 127.

Figure 4:
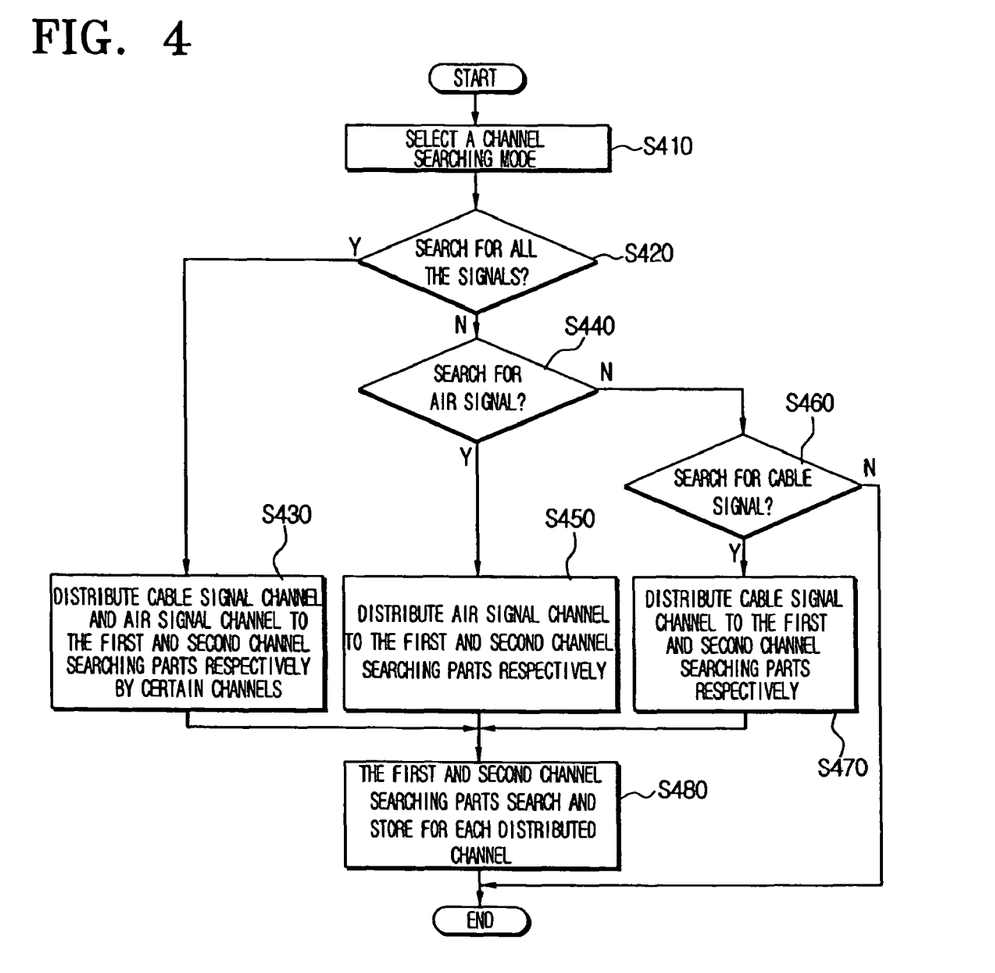
FIG. 4 is a flow chart explaining a method of searching a channel according to another embodiment of the present general inventive concept.

FIG. 4 is a flowchart explaining a channel searching method of a digital broadcasting receiver according to another embodiment of the present general inventive concept. Referring to FIGS. 2, 3, and 4, if a channel searching mode is selected (S410), it is determined whether a channel is searched from cable broadcasting signal or the air broadcasting signal (S420, S440 and S460).

If the channel is searched from both the air and cable broadcasting signals, the air broadcasting signal channel and the cable broadcasting signal channel can be distributed to corresponding ones of the first and second channel searching parts 120 and 130 by certain channels (S430). The first and second channel searching part 120 and 130 can search whether the digital signal and the analog signal are received within each distributed channel range, and can transmit the searched result to the control part 140. The control part 140 can determine the channel, through which a certain broadcasting signal is received, is the valid channel, and can store the channel in the memory 150 (S480).

If a channel is searched only from air broadcasting signal (S440), the entire channel range of the air broadcasting signal can be distributed by a certain range to the first and second channel searching parts 120 and 130 (S450), and the valid channel can be determined from each distributed channel range and stored (S480).

If a channel is searched only from cable broadcasting signal (S460), the entire channel range of cable broadcasting signal can be likewise distributed and the valid channel can be determined and stored (S470 and S480).

Figure 5:
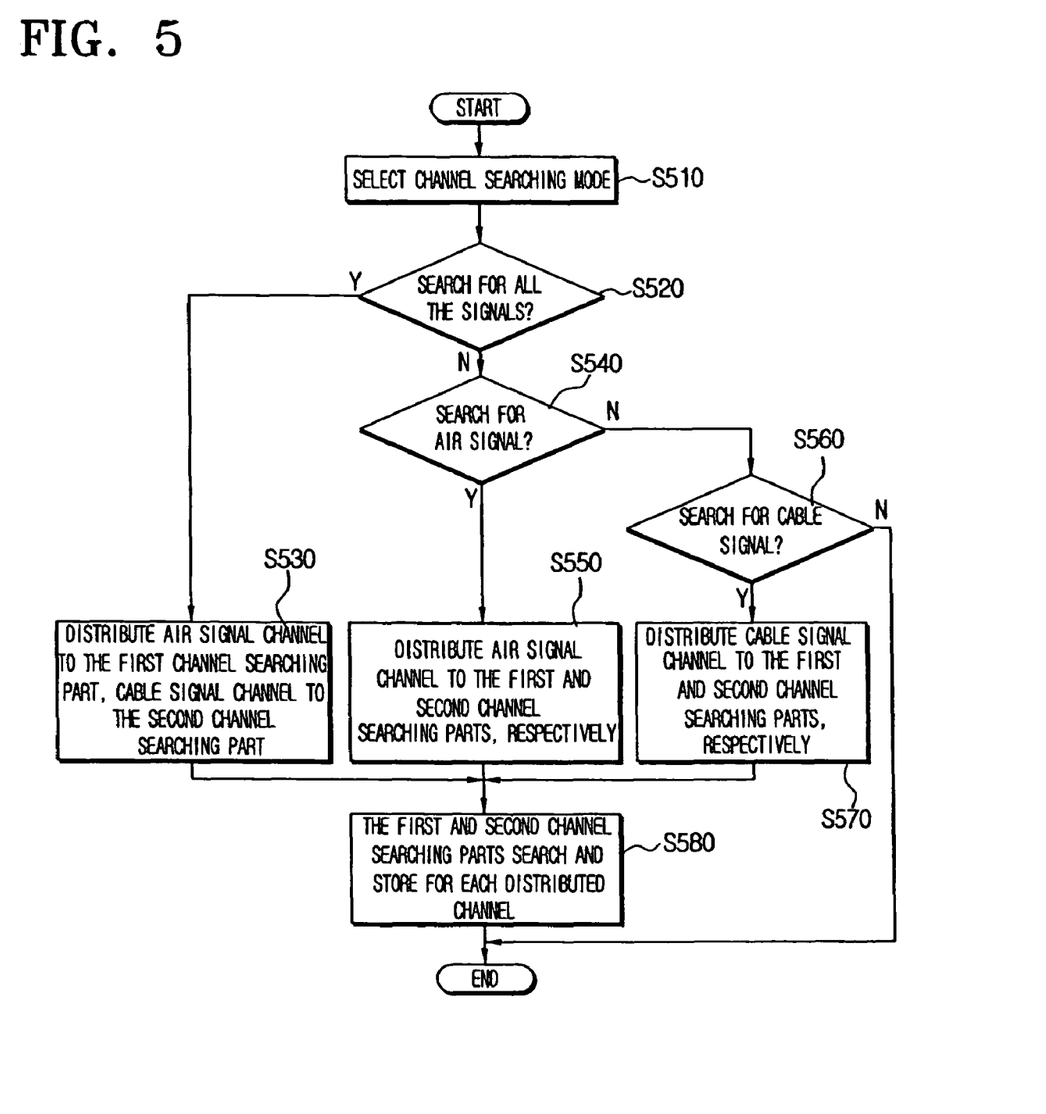
FIG. 5 is a flow chart explaining a method of searching a channel according to another embodiment of the present general inventive concept.

FIG. 5 is a flow chart explaining a channel searching method of a digital broadcasting receiver of FIG. 5. The embodiment of FIG. 5 distinguishes from the embodiment of FIG. 4 only in the kinds of the distributed signals when the channel is searched from all the signals. In specific, the channel searching mode is selected (S510) and it is determined whether the channel is searched from the air or cable broadcasting signal (S520, S540 and S560). The channel can be searched from all the broadcasting signals, and the cable broadcasting signal channel can be distributed to the first channel searching part 120, and the air broadcasting signal channel can be distributed to the second channel searching part 130 (S530). The digital and analog broadcasting signals can be searched in parallel from the distributed channel range when the digital and analog signals are received, and the result of the search can be stored (S580).

If a channel is searched only from the air broadcasting signal (S540 and S550), or only from the cable broadcasting signal (S560 and S570), the signals are processed in the same way as the embodiment of FIG. 4.

Because all the broadcasting channel ranges of the air and cable broadcasting signals are searched, and the channels through which the digital and analog broadcasting signals are received are determined and recorded in the memory 150, a user can easily select the channel.

As described above, channel receiving digital and analog signals included in the air and cable broadcasting signals can be simultaneously searched using at least two channel searching parts in parallel. The two channel searching parts can individually tune the digital signal to convert a channel such that the time for entire channel searching can be reduced. Accordingly, a user can efficiently search all channels in the digital broadcasting receiver capable of receiving both the analog and digital broadcasting signals.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A digital broadcasting receiver comprising:
    a RF switch to divide an entire channel range of an input signal having at least one of an air and a cable signals into at least two channel ranges;
    at least two channel searching parts to search each channel range distributed from the RF switch for a valid channel by checking in sequence from a lowest channel to a highest channel within the each channel range, and to determine whether one of a digital signal and an analog signal is received;
    a memory to record information on the valid channel through which one of the digital signal and the analog signal is received in the entire channel range of the input signal; and
    a CPU to control the at least two channel searching parts in parallel to search each distributed channel range, and to determine whether the channel to receive the input signal is the valid channel if the channel searching parts determine that one of the air, cable, digital, and analog signals is received and to record the valid channel into the memory.

2. The digital broadcasting receiver of claim 1, wherein each of the two channel searching parts comprises:
    a tuner part to tune the input signal from the distributed channel range; and
    a demodulation block to demodulate the tuned signal according to a broadcasting system.

3. The digital broadcasting receiver of claim 2, wherein the demodulation block comprises:
    an analog signal demodulation block to demodulate a tuned analog signal;
    a DTV demodulation block to demodulate a tuned digital signal; and
    a QAM demodulation block to demodulate a tuned QAM-modulated digital signal.

4. The digital broadcasting receiver of claim 1, wherein the at least two channel search parts search the valid channel in parallel from the at least two channel ranges.

5. The digital broadcasting receiver of claim 1, wherein the signal comprises the cable signal other than the air signal, and the at least two channel searching parts simultaneously search for the each channel from the at least two channel ranges to correspond to a first and a second portions of the cable signal, respectively.

6. The digital broadcasting receiver of claim 5, wherein the cable signal comprises one of the digital signal and the analog signal.

7. The digital broadcasting receiver of claim 2, wherein the signal comprises the air signal other than the cable signal, and the at least two channel searching parts simultaneously search for the each channel from the at least two channel ranges to correspond to a first and a second portions of the air signal, respectively.

8. The digital broadcasting receiver of claim 7, wherein the air signal comprises one of the digital signal and the analog signal.

9. A digital broadcasting receiver comprising:
    a RF switch to divide a received broadcasting signal into an air broadcasting signal and a cable broadcasting signal;
    a first channel searching part to search the entire channel range of the air broadcasting signal distributed from the RF switch and to sequentially check from a lowest channel to a highest channel within the entire channel range of the air signal to determine whether the received signal is one of a digital broadcasting signal and an analog broadcasting signal and to determine a valid air channel;
    a second channel searching part to search the entire channel range of the cable broadcasting signal distributed from the RF switch and to sequentially check from the lowest channel to the highest channel within the entire channel range to determine whether the received signal is one of the digital broadcasting signal and the analog broadcasting signal, and to determine a valid cable channel;

a memory to record information on the valid air or cable channel through which one of the digital broadcasting signal and the analog broadcasting signal is received; and a CPU to control the first and second channel searching parts in parallel to search the entire channel range of the received signal distributed to each of the first and second channel searching parts, and to determine whether a channel to receive the received signal is the valid air or cable channel, and to record the valid air or cable channel in the memory.

10. The digital broadcasting receiver of claim 9, wherein the first channel searching part comprises:

a tuner part to tune the received digital and analog signals from the entire channel range of the air broadcasting signal; and a demodulation block to demodulate the digital and analog signals tuned from the tuner part according to a corresponding broadcasting system.

11. The digital broadcasting receiver of claim 9, wherein the second channel searching part comprises:

a tuner part to tune the received digital and analog signals from the entire channel range of the cable broadcasting signal; and a demodulation block to determine the digital and analog signals tuned from the tuner part according to a corresponding broadcasting system.

12. A channel searching method of a digital receiver having at least two channel searching parts to determine whether a digital signal and an analog signal within a certain channel range are received, the channel searching method comprising:

dividing an entire channel range of an input signal into at least two channel ranges to correspond to an air signal and a cable broadcasting signal and distributing the divided channel range to the at least two channel searching part by a certain channel range;

sequentially checking channels from a lowest channel to a highest channel within the channel range, to determine whether the input signal is one of the digital signal and the analog signal, from the channel ranges each distributed to the at least two channel searching parts; and selecting a valid channel from the channel ranges to receive one of the digital signal and the analog signal, and recording the valid channel.

13. The channel searching method of claim 12, wherein the sequentially checking of the channels comprises:

sequentially tuning the digital signal and the analog signal received within each distributed channel range in the at least two channel searching parts; and demodulating the tuned digital and analog signals, respectively.

14. The channel searching method of claim 12, wherein the dividing of the entire channel range comprises dividing the air signal and the cable signal if the channel is searched from the air and cable signals, and distributing the divided air and cable signals to the at least two channel searching parts, respectively.

15. The channel searching method of claim 12, further comprising:

receiving the cable signal and the air signal; and inputting an automatic channel search command to correspond to at least one of the received cable signal and the received air signal.

16. The channel searching method of claim 12, wherein the sequentially checking of the channels comprise:

simultaneously checking the each channel from the air signal and the cable signal.

17. The channel searching method of claim 12, wherein the sequentially checking of the channels comprises:

simultaneously checking the each channel from the air signal having one of the digital signal and the analog signal and the cable signal having the other one of the digital signal and the analog signal.

* * * * *